United States Patent [19]

Tsugukuni et al.

[11] 4,098,844
[45] Jul. 4, 1978

[54] THERMOSETTING POLYMER DISPERSIONS AND PROCESS FOR PRODUCTION THEREOF

[75] Inventors: Hideyoshi Tsugukuni, Sakai; Masafumi Kano, Kyoto; Mitsuhiro Matsuda, Tondabayashi, all of Japan

[73] Assignee: Dai Nippon Toryo Co., Ltd., Osaka, Japan

[21] Appl. No.: 603,115

[22] Filed: Aug. 8, 1975

Related U.S. Application Data

[62] Division of Ser. No. 374,656, Jun. 28, 1973, Pat. No. 3,926,875.

[30] Foreign Application Priority Data

Jul. 3, 1972 [JP] Japan ................................. 47-66432

[51] Int. Cl.$^2$ ..................... C08G 18/06; C08G 18/80
[52] U.S. Cl. ........................ 260/859 R; 260/18 TN; 260/33.6 UB; 260/23 TN; 528/273
[58] Field of Search ................. 260/33.6 R, 33.6 UB, 260/34.2, 18 TN, 23 TN, 22 TN, 77.5 TB, 77.5 CR, 859 R

[56] References Cited

U.S. PATENT DOCUMENTS

| | | | |
|---|---|---|---|
| 3,542,739 | 11/1970 | Krimm | 260/77.5 |
| 3,676,405 | 7/1972 | Labana | 260/77.5 CR |
| 3,694,389 | 9/1972 | Levy | 260/23 TN |
| 3,719,522 | 3/1973 | Johnson | 260/77.5 TB X |
| 3,745,138 | 7/1973 | Koerner | 260/859 |
| 3,810,855 | 5/1974 | Tugukuni | 260/22 CB |
| 3,853,822 | 12/1974 | Brod | 260/77.5 CR |

*Primary Examiner*—Christopher A. Henderson
*Attorney, Agent, or Firm*—Haseltine, Lake & Waters

[57] ABSTRACT

A thermosetting synthetic polymer dispersion obtained by copolymerizing unsaturated monomers in a non-polar organic liquid or an organic liquid having a low polarity in the presence of a stabilizer formed by reacting (1) a partially blocked isocyanate containing a free isocyanate group and a blocked isocyanate group with (2) an active hydrogen-containing, polymer compound in such a ratio that the amount of the active hydrogen group of the compound (2) is at least equivalent to the amount of the free isocyanate group of the isocyanate compound (1), and a process for the preparation of such a thermosetting synthetic polymer dispersion.

6 Claims, 2 Drawing Figures

THERMOSETTING POLYMER DISPERSIONS AND PROCESS FOR PRODUCTION THEREOF

This application is a Divisional Application, of Ser. No. 374,656, filed June 28, 1973, now U.S. Pat. No. 3,926,875, issued Dec. 16, 1975.

DESCRIPTION OF THE PRIOR ART

Solutions formed by dissolving a synthetic resin in a solvent and aqueous emulsions formed by dispersing a synthetic resin in water have heretofore been known in the art. These known solutions and emulsions, however, have defects and shortcomings such as mentioned below.

(1) A solution or aqueous emulsion of a low viscosity having a high polymer concentration cannot be obtained. For instance, in the case of an organic solvent solution it is impossible to obtain a solution or emulsion having a polymer concentration of 40 – 50% by weight while retaining the viscosity at a level of about 100 cps.

(2) The water resistance of the resulting film is poor. Since a hydrophilic emulsifier is used in a large amount in an ordinary emulsion composition, the water resistance of a film prepared from such an emulsion is extremely poor.

(3) The mechanical properties of the resulting film are inferior. The higher the degree of polymerization of the synthetic polymer in the case of a solvent solution type composition, the higher the viscosity of the solution. Thus, it is not possible to use a polymer having a high degree of polymerization, and therefore, the resulting film is inferior with respect to the tensile strength and the resistance to thermal degradation and impact.

(4) The gloss of the resulting film is low. For instance, a film prepared from an aqueous emulsion type coating composition exhibits only a very low gloss.

(5) In the case of an emulsion type coating composition, destruction of the emulsion by freezing occurs easily.

(6) Solvents used for formation of solvent solution type compositions tend to cause air pollution.

It is also known that non-aqueous synthetic polymer dispersions have been developed as compositions overcoming the foregoing defects of solvent solutions and aqueous emulsions of synthetic polymers. Some of the methods for preparing such thermosetting polymer dispersions are described below:

(1) A method for forming a cross-linkable polymer dispersion comprising the first step of copolymerizing an ethylenically unsaturated monomer with another ethylenically unsaturated monomer having a chemically reactive, cross-linking group in the presence of a block or graft copolymer dispersion stabilizer and the second step of adding an ethylenically unsaturated monomer and another ethylenically unsaturated monomer having a complementary, chemically reactive cross-linking group to the reaction mixture and copolymerizing them in the reaction mixture (see U.S. Pat. No. 3,382,297 and British Pat. No. 1,095,288).

(2) a method for preparing a cross-linkable dispersion having an automatically oxidative component or a component capable of free-radical initiating addition reaction, which comprises forming a dispersion of an insoluble polymer containing at least one chemically reactive group per molecule of the polymer by dispersion polymerization of an $\alpha,\beta$-ethylenically unsaturated monomer in the presence of a stabilizer, and reacting the resulting insoluble polymer with an unsaturated component having a complementary, chemically reactive group (see Japanese Patent Publication No. 9708/71).

(3) A method for forming a coating composition which comprises copolymerizing an olefinically unsaturated monomer having an alcoholic hydroxyl group with another olefinically unsaturated monomer in the presence of a polymer soluble in an organic liquid, and reacting the resulting copolymer with a polyisocyanate (see Japanese Patent Publication No. 25015/71).

As is apparent from the foregoing explanation, each of the conventional cross-linkable polymer dispersions is of the one-component type, and both the chemically reactive, cross-linking group and the complementary, chemically reactive, cross-linking group are present in said one component. Accordingly, the reaction readily occurs between the chemically reactive, cross-linking group and the complementary, chemically reactive, cross-linking group in such polymer dispersion. Therefore, cross-linking and gelation easily occur during the synthesis reaction, and hence, the thermal stability and storage stability of the resulting polymer dispersion are extremely poor.

In the case of a dispersion of a polymer capable of auto-oxidation or free radical-initiated cross-linking, limitations are imposed on the system for such auto-oxidation or radical-initiated cross-linking reaction. More specifically, in the case of a polymer dispersion of the auto-oxidation type, kind of the automatically oxidative component which can be used is limited, and therefore, application fields of the resulting polymer dispersion are very limited. In the case of a polymer dispersion of the radical initiated cross-linking reaction type, since it is difficult to obtain a cross-linked polymer because a linear polymer is easily formed, the kind of the component which can be used is greatly limited. Furthermore, in the case of a polymer dispersion of this type, it is impossible to obtain thermosetting characteristics for formation of a film or coating.

Moreover, most of blocked polyisocyanate compounds conventionally used in this field are insoluble or difficulty soluble in solvents having a relatively low dissolving power, such as mineral spirits, and are poor in compatibility with polyol-type, resin-constituting components to be used in combination. Further, when a dispersion derived from such blocked polyisocyanate compound and polyol component is employed as coating composition, it has a poor storage stability and the resulting film is inferior in gloss. For these reasons, blocked polyisocyanates have not commercially been employed as the component of a synthetic polymer dispersion.

SUMMARY OF THE INVENTION

This invention relates to a novel thermosetting synthetic polymer dispersion which can overcome the foregoing defects of the conventional techniques.

More particularly, the invention relates to a thermosetting synthetic polymer dispersion comprising (I) a stabilizer solvated in an organic liquid, which is prepared by selecting a partially blocked isocyanate compound containing a free isocyanate group and a blocked isocyanate group and an active hydrogen-containing, polymer compound so that the sum of the number of the free isocyanate and blocked isocyanate groups in one molecule of the partially blocked isocyanate compond and the number of the active hydrogen groups in one molecule of the polymer compound is in least 5 and reacting them at such a ratio that the amount of the active hydrogen group in the polymer compound is at least equivalent to the amount of the free isocyanate group of the partially blocked isocyanate compound, (II) a copolymer formed by copolymerization of copolymerizable unsaturated monomers, and (III) a nonpolar organic liquid or an organic liquid having a low polarity, and to a process for the preparation of such thermosetting synthetic polymer dispersion.

BRIEF DESCRIPTION OF THE DRAWINGS

FIG. 1-(II) is a model view showing the state in which the polymer particles are made to approximate each other by evaporation of the organic liquid caused by heating conducted after coating of the polymer dispersion and releasing of the blocking agent B occurs; and FIG. 1-(III) is a model view showing the melt adhesion of the polymer particles and the initiation of the reaction of the free NCO group formed by releasing of the blocking agent B with the active hydrogen group H.

DETAILED DESCRIPTION OF THE INVENTION:

The objects of this invention are as follows:

(1) To obtain a stable polymer dispersion by solubilizing a blocked polyisocyanate compound in an organic liquid and making it compatible with an active hydrogen-containing, organic resin component.

(2) To obtain a polymer dispersion in which gelation or the like does not occur during the synthesis reaction.

(3) To obtain a polymer dispersion having excellent storage stability.

(4) To obtain a film having high chemical resistance and solvent resistance and good rust-preventive properties.

The thermosetting synthetic polymer dispersion of this invention is prepared in the following manner.

Namely, according to this invention, a thermosetting synthetic polymer dispersion is prepared by copolymerizing copolymerizable unsaturated monomers in a nonpolar organic liquid or an organic liquid having a low dissolving power, which can dissolve monomers but are incapable of dissolving polymers formed by polymerization of the monomers, in the presence of a stabilizer solvated in said organic liquid, said stabilizer being obtained by selecting a partially blocked isocyanate compound having a free isocyanate group and a blocked isocyanate group and an active hydrogen-containing, polymer compound so that the sum of the number of the free and blocked isocyanate groups in one molecule of the isocyanate compound and the number of the active hydrogen groups in one molecule of the active hydrogen-containing, polymer compound is at least 5 and reacting them at such a ratio that the amount of the active hydrogen group in the active hydrogen-containing, polymer compound is at least equivalent to the amount of the free isocyanate group in the partially blocked isocyanate compound.

In the polymer dispersion of this invention, in case an unsaturated double bond is present in the stabilizer solvated in the organic liquid, the copolymerizable monomer is block- or graft-copolymerized with the stabilizer. In case the content of the unsaturated double bond is extremely low in the stabilizer, the copolymer of the monomer is closely entangled with the stabilizer and is present stably in the organic liquid.

Figure 1:
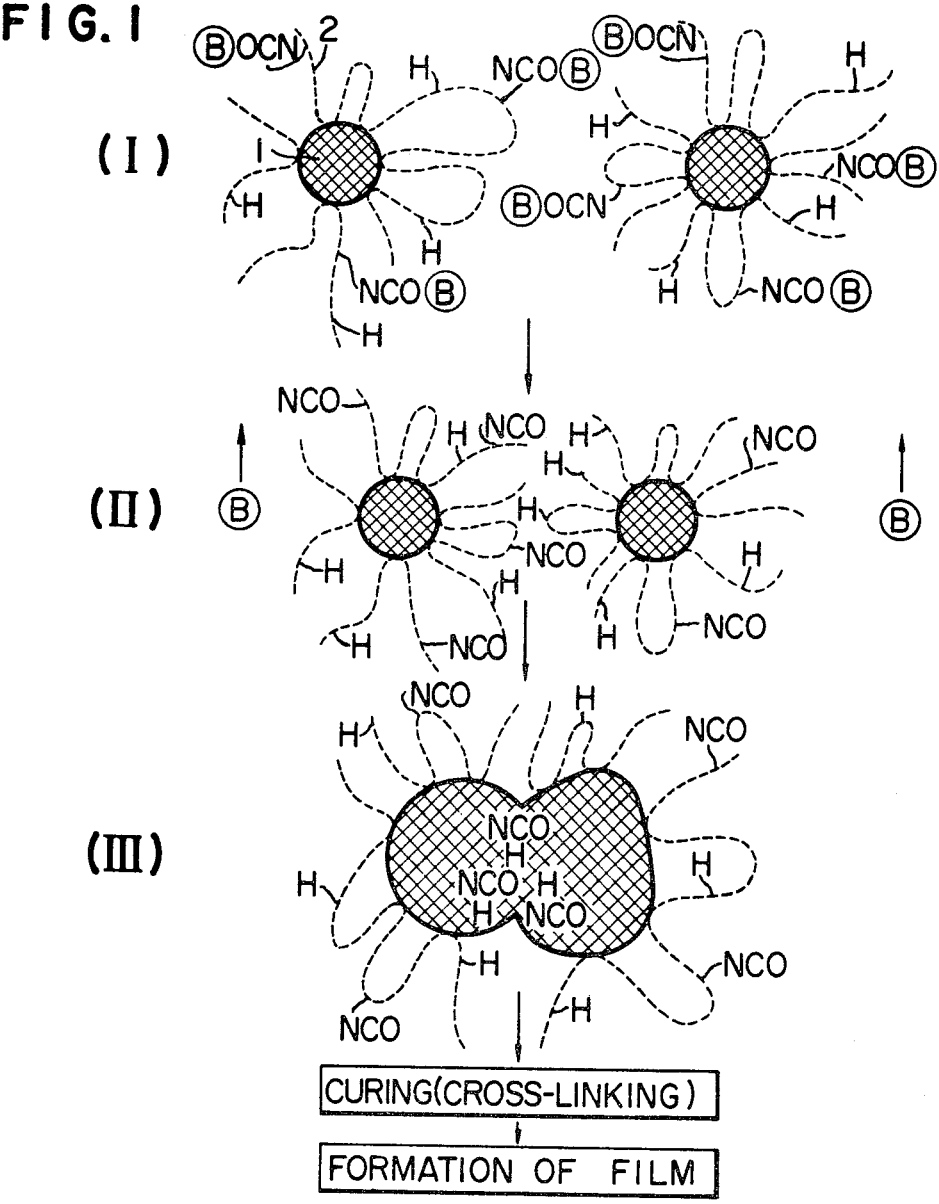
FIG. 1 diagrammatically illustrates the process of formation of a film of the thermosetting synthetic polymer dispersion of this invention, in which FIG. 1-(I) is a model view showing 2 particles of the synthetic polymer in which H indicates the active hydrogen group, NCO B indicates the blocked isocyanate group, the reference numeral 1 indicates the polymer particle insoluble in the organic liquid and the reference numeral 2 indicates the stabilizer soluble in the organic liquid.
Figure 2:
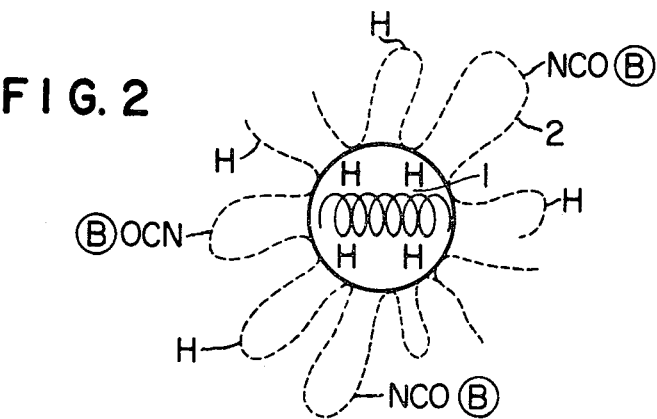
FIG. 2 diagrammatically illustrates the state of one polymer particle in which both the copolymer 1 formed by copolymerization of copolymerizable unsaturated monomers and the stabilizer 2 contain active hydrogen groups.

Accordingly, in the polymer dispersion of this invention, as is diagrammatically shown in FIG. 1-(I), each polymer particle is stably dispersed in the organic liquid with the solvated component being disposed on the outer peripheral portion. In the polymer dispersion of this invention, the active hydrogen group, which is reacted with the blocked isocyanate group at the film-forming stage, may be present in either the stabilizer or the copolymerizable monomer, or in both of them. In each case, the blocking agent is released from the blocked isocyanate group by heating, and the resulting free isocyanate group is reacted with the active hydrogen group to form a strong cross-linkage.

The organic liquid to be used in this invention, which is capable of dissolving monomers but incapable of dissolving polymers formed from the monomers, includes organic liquids having no polarity or a relatively low dissolving power, such as aliphatic and aromatic hydrocarbons, e.g., VM & P naphtha, mineral spirits, kerosene, petroleum naphtha, and solvent naphtha; aliphatic hydrocarbons, e.g., n-butane, n-hexane, n-heptane, n-octane, isononane, n-decane and n-dodecane; and alicyclic hydrocarbons, e.g., cyclopentane, cyclohexane and cycloheptane. They may be used singly or in the form of admixtures of two or more of them.

The blocked isocyanate-group-containing resin (stabilizer) which is solvated in the organic liquid can be obtained by reacting a partially blocked isocyanate compound containing a free isocyanate group and a blocked isocyanate group with an active hydrogen-containing, polymer compound. The "partially blocked isocyanate compound" to be used in this invention means a polyisocyanate compound in which some of the free isocyanate groups are blocked with a blocking agent. As such partially blocked isocyanate compounds, there may be mentioned, for example, (1) partially blocked diisocyanates, namely diisocyanates having one free isocyanate group and one blocked isocyanate group, and (2) partially blocked triisocyanates, namely triisocyanates having one free isocyanate group and two blocked isocyanate groups, and triisocyanates having two free isocyanate groups and one blocked isocyanate group.

These partially blocked isocyanate compounds are generally prepared by reacting a polyisocyanate compound with a blocking agent at such a ratio that the amount of the blocking agent is about 0.04 to about 0.7 mole per isocyanate group of the polyisocyanate compound, and the reaction is carried out according to customary blocking reaction procedures. More specifically, such partially blocked isocyanate compounds can be prepared by reacting a prescribed amount of a polyisocyanate compound with a prescribed amount of a blocking agent at about 50 to about 160° C. in the presence or absence of an inert solvent, if necessary, with use of a catalyst.

Any of the inert solvents which are free of an active hydrogen atom and are ordinarily used for the isocyanate-blocking reaction can be used as the inert solvent in the above reaction. Examples of such inert solvents include esters such as ethyl acetate and butyl acetate, ketones such as methyl ethyl ketone and methyl isobutyl ketone ethers such as diethyl ether and cellosolve acetate, and aromatic hydrocarbons such as benzene and toluene.

As the catalyst to be used for formation of the partially blocked isocyanate compound, there can be employed those customarily used for the ordinary blocking reaction of isocyanate compounds. For instance, there can be mentioned tertiary amines such as triethyl amine, triethylene diamine and N-methyl morpholine, and organic tin compounds such as stannous octoate, dibutyl tin dilaurate and distannoxane.

The resulting partially blocked isocyanate compound formed by the above reaction sometimes includes the unreacted free polyisocyanate compound or a completely blocked compound formed as a by-product. In some cases, such partially blocked polyisocyanate compound containing the unreacted free polyisocyanate compound or completely blocked by-product can be used in this invention as is. However, it is sometimes desired that such unreacted polyisocyanate compound or completely blocked by-product is removed by distillation, film distillation, adsorption or the like.

As described above, the blocking agent which is used for the partial blocking reaction is generally about 0.04 to about 0.7 mole per isocyanate group of the polyisocyanate compound. In case it is necessary to remove the unreacted polyisocyanate compound and/or completely blocked by-product remaining in the partially blocked product, it is preferred that the blocking agent is used in an amount of about 0.1 to about 0.3 mole per isocyanate group of the polyisocyanate compound. In case it is permissible to employ the partially blocked product in the state containing the unreacted polyisocyanate compound and/or completely blocked by-product, it is preferred that the blocking agent be used in an amount of about 0.4 to about 0.6 mole per isocyanate group of the polyisocyanate compound.

Known polyisocyanate compounds can be used in this invention for formation of the above-mentioned partially blocked isocyanate compound. For example, there can be used ethylene diisocyanate, propylene diisocyanate, tetramethylene diisocyanate, hexamethylene diisocyanate, decamethylene diisocyanate, phenylene diisocyanate, tolylene diisocyanate, naphthylene diisocyanate, 4,4′-methylene-bis (phenyl isocyanate), 4,4′-ethylene-bis(phenyl isocyanate), ω,ω′-diisocyanate-1,3-dimethylbenzene, ω,ω′-diisocyanate-1,4-dimethylbenzene, 1-methyl-2,4-diisocyanate-cyclohexane, ω,ω′-diisocyanate-diethylbenzene, ω,ω′-diisocyanate-dimethyltoluene, ω,ω′-diisocyanate-diethyltoluene, ω, ω′-diisocyanate-dimethylxylene, $\frac{2}{5},\frac{2}{5}$′-diisocyanate-diethylxylene, 4,4′-methylene-bis(cyclohexyl isocyanate), 4,4′-ethylene-bis(cyclohexyl isocyanate), isophorone diisocyanate, lysine isocyanate methyl ester and triphenylmethane triisocyanate; di- or polyisocyanate compounds obtained by addition reaction between an excess of a polyisocyanate compound selected from the above-exemplified isocyanate compounds and a low-molecular-weight polyol such as ethylene glycol, propylene glycol, 1,3-butylene glycol, neopentyl glycol, 2,2,4-trimethyl-1,3-pentanediol, hexamethylene glycol, cyclohexane dimethanol, trimethylol propane, hexane triol, glycerin sorbitol, sorbitol, sucrose and pentaerythritol; polyisocyanate compounds having a biuret structure; and polyisocyanate compounds having an allophanate linkage.

Among the above-exemplified isocyanates, diisocyanates and triisocyanates are preferred. Especially preferred are such aliphatic, alicyclic and aromatic isocyanates as ethylene diisocyanate, tetramethylene diisocyanate, hexamethylene diisocyanate, 4,4′-methylene-bis (cyclohexyl isocyanate), lysine isocyanate methyl ester, 4,4′-ethylene-bis(cyclohexyl isocyanate), $\frac{2}{5},\frac{2}{5}$′-diisocyanate-1,3-dimethylbenzene, $\frac{2}{5},\frac{2}{5}$′-diisocyanate-1,4-dimethylbenzene and isophorone diisocyanate; and adducts formed by reacting an excess of such isocyanate with a low-molecular-weight polyol such as mentioned above. These isocyanate compounds may be used singly or in the form of admixtures of two or more of them.

Blocking agents known to be applicable to the blocking reaction of isocyanates are used in this invention for formation of the partially blocked isocyanate compounds. For instance, there can be used known blocking agents of the phenol type, lactam type, active methylene type, alcohol type, mercaptan type, acid amide type, imide type, amine type, imidazole type, urea type, carbonate type, imine type, oxime type and sulfite type. Blocking agents of the phenol type, oxime type, lactam type and active methylene type are used especially advantageously.

Specific examples of the blocking agent to be used in this invention are as follows:

(a) Phenol type blocking agent

Phenol, cresol, xylenol, nitrophenol, chlorophenol, ethylphenol, t-butylphenol, hydroxybenzoic acid, hydroxybenzoic acid esters, 2,5-di-tert-butyl-4-hydroxytoluene, etc.

(b) Lactam type blocking agent

ε-Caprolactam, Δ-valerolactam, γ-butyrolactam, β-propiolactam, etc.

(c) Active methylene type blocking agent

Diethyl malonate, dimethyl malonate, ethyl acetoacetate, methyl acetoacetate, acetylacetone, etc.

(d) Alcohol type blocking agent

Methanol, ethanol, n-propyl alcohol, isopropyl alcohol, n-butyl alcohol, isobutyl alcohol, t-butyl alcohol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic acid esters, lactic acid, lactic acid esters, methylol urea, methylol melamine, diacetone alcohol, ethylene chlorohydrin, ethylene bromohydrin, 1,3-dichloro-2-propanol, ω-hydroperfluoro-alcohol, acetocyanohydrin, etc.

(e) Mercaptan type blocking agent

Butylmercaptan, hexylmercaptan, t-butylmercaptan, t-dodecylmercaptan, 2-mercaptobenzothiazole, thiophenol, methylthiophenol, ethylthiophenol, etc.

(f) Acid amide type blocking agent

Acetoanilide, acetoanisidide, acetotoluide, acrylamide, methacrylamide, acetamide, stearylamide, benzamide, etc.

(g) Imide type blocking agent

Succinimide, phthalimide, maleimide, etc.

(h) Amine type blocking agent

Diphenyl amine, phenylnaphthyl amine, xylidine, N-phenylxylidine, carbazole, aniline, naphthyl amine, butyl amine, dibutyl amine, butylphenyl amine, etc.

(i) Imidazole type blocking agent
Imidazole, 2-ethylimidazole, etc.
(j) Urea type blocking agent
Urea, thiourea, ethylene urea, ethylene thiourea, 1,3-diphenylurea, etc.
(k) Carbamate type blocking agent
Phenyl N-phenylcarbamate, 2-oxazolidone, etc.
(l) Imine type blocking agent
Ethyleneimine, etc.
(m) Oxime type blocking agent
Formaldoxime, acetaldoxime, acetoxime, methylethylketoxime, diacetyl monoxime, benzophenone oxime, cyclohexanone oxime, etc.
(n) Sulfite type blocking agent
Sodium bisulfite, potassium bisulfite, etc.

By the term "active hydrogen-containing, polymer compound" used herein is meant vinyl polymers which are soluble in the organic liquid and have active hydrogen atoms, and unsaturated fatty acid-containing oil-modified alkyd resins, epoxy ester resins, epoxy-modified alkyd resins, urethanated oil resins, maleic oil resins, and the like. Use of unsaturated fatty acid-containing oil-modified resins is especially preferred. It is indispensable that these resin components have a molecular weight of 500 to 10,000, preferably 1,000 to 4,000, an acid value of less than 75, preferably less than 15, and an OH value of at least 10. In case the OH value of the resin is less than 10, it is difficult to react the resin with the partially blocked isocyanate compound, and when the resulting dispersion is heated, the attained degree of cross-linking is very low and sufficient film-properties cannot be obtained in the resulting polymer dispersion.

Unsaturated fatty acid-containing oils to be used preferably in this invention include drying oils and semidrying oils such as linseed oil, tung oil, Chinese tung oil, oiticica oil, perilla oil, dehydrated castor oil, tall oil, soybean oil, safflower oil, cotton seed oil and rice bran oil. In some cases, non-drying oils such as coconut oil, olive oil and castor oil may be used. These oils may be used singly or in the form of admixtures of two or more of them.

The "unsaturated fatty acid-containing oil-modified alkyd resin" to be usd in this invention includes those obtained by polycondensing (1) a basic acid component selected from (a) saturated polybasic acids such as phthalic anhydride, terephthalic acid, isophthalic acid, tetrachlorophthalic anhydride, tetrahydrophthalic anhydride, succinic acid, adipic acid and sebacic acid, (b) unsaturated polybasic acids such as maleic acid, maleic anhydride, fumaric acid, itaconic acid and citraconic anhydride, (c) polybasic acids obtained by diene-synthesis such as cyclopentadiene-maleic anhydride adduct, terpene-maleic anhydride adduct and rosin-maleic anhydride adduct, and (d) monobasic acids such as benzoic acid and p-tert-butyl benzoic acid, (2) a polyhydric alcohol component selected from (a) dihydric alcohols such as ethylene glycol, diethylene glycol, triethylene glycol, propylene glycol, trimethylene glycol and tetramethylene glycol and (b) trihydric alcohols such as glycerin and trimethylol propane, and (3) an oil component selected from the above exemplified oils.

These oil-modified alkyd resins may be prepared by condensing the above components by usual methods, and they have a molecular weight of 500 to 10,000, preferably 2,000 to 4,000, and an acid value of less than 75, preferably less than 15. It is indispensable that these modified resins should have an OH value of at least 10.

In the preparation of the oil-modified alkyd resins, it is possible to obtain OH group-containing products optionally by selecting starting materials or reaction conditions appropriately in compliance with known techniques.

The "unsaturated fatty acid-containing oil-modified epoxy resin" to be used in this invention includes resins having an acid value of less than 75, preferably less than 15, an OH value of at least 10, and a molecular weight of about 1,000 to about 3,000, which are formed by esterifying an epoxy resin with an oil component such as those mentioned above.

The "unsaturated fatty acid-containing oil-modified epoxy-modified alkyd resin" to be used in this invention includes resins having an acid value of less than 75, preferably less than 15, an OH value of at least 10, and a molecular weight of about 1,000 to about 4,000, which are obtained by reacting the above epoxy ester resin with a polyhydric alcohol and mono- or polybasic acid.

The epoxy resin to be used for formation of the above epoxy ester resin and epoxy-modified alkyd resin includes resins having at least two epoxy groups in the molecule, such as epoxy resins of the bisphenol A-epichlorohydrin condensation type, the halogenated bisphenol type, the resorcine type, the bisphenol F type, the tetrahydroxyphenyl methane type, the novolac type, the polyglycerol type and of the glycerine triether type. The weight ratio of such epoxy resin to the oil component is preferably in the range of from 5/95 to 70/30.

As the basic acid to be used for formation of the epoxy-modified alkyd resin, there may be mentioned mono- and polybasic acids such, for example, as benzoic acid, p-tert-butylbenzoic acid, phthalic anhydride, maleic anhydride, isophthalic acid, terephthalic acid, tetrachlorophthalic anhydride, HET acid, succinic acid, adipic acid and sebacic acid. As the polyhydric alcohol, there may be exemplified ethylene glycol, propylene glycol, diethylene glycol, butylene glycol, 2,2'-dimethylpropane diol, glycerin, trimethylol ethane, trimethylol propane, 1,2,6-hexane triol, pentaerythritol, sorbitol, diglycerol and dipentaerythritol.

The "maleic oil resin" to be used in this invention includes resins having an acid value of less than 75, preferably less than 15, an OH value of at least 10, and a molecular weight of about 1,000 to about 2,000, which are formed by addition reaction between an oil component such as those mentioned above and maleic anhydride, maleic acid, fumaric acid or a derivative of maleic anhydride. It is preferred that in the above addition reaction the ratio of the acid component to the unsaturated fatty acid-containing oil component is within the range of from 5/95 to 20/80.

Specific examples of the maleic oil resin are as follows.

(1) Maleic oil resin formed from linoleic acid and maleic anhydride and expressed by the following formula:

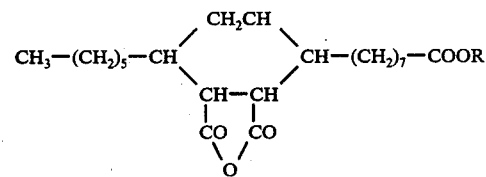

(2) Maleic oil resin formed from oleostearic acid and maleic anhydride and expressed by the following formula:

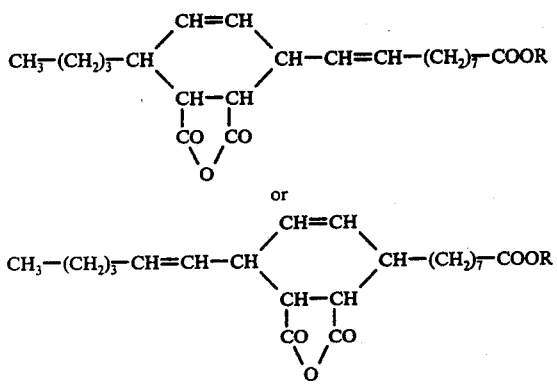

or (3) Maleic oil resin formed from oleic acid and maleic anhydride and expressed by the following formula:

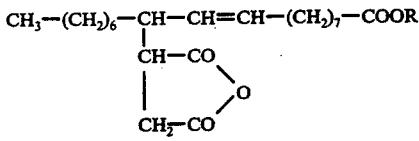

If necessary, it is possible to introduce active hydrogen atoms into the maleic oil resin by reacting it with a polyhydric alcohol such, for example, as those exemplified above with respect to the unsaturated fatty acid-containing oil-modified alkyd resin.

The "urethanated oil resin" to be used in this invention includes resins having an acid value of less than 20, an OH value of at least 10 and a molecular weight of about 1,000 to about 3,000, which are formed by the reaction between a diisocyanate such as those mentioned above and a monoglyceride or diglyceride which is a product formed by the reaction between a polyhydric alcohol and an oil component selected from those mentioned above. In the urethanated oil resin, it is preferred that the weight ratio of the isocyanate component to the oil component (glyceride) is within the range of from 5/95 to 70/30.

As the polyhydric alcohol to be used for formation of the glyceride component, there may be mentioned, for example, ethylene glycol, propylene glycol, diethylene glycol, butylene glycol, 2,2'-dimethylol propane diol, glycerin, trimethylol ethane, trimethylol propane, 1,2,6-hexane triol, pentaerythritol, sorbitol, diglycerol and dipentaerythritol.

The preparation of a monoglyceride and the formation of the urethanated oil resin from, for example, a monoglyceride and a diisocyanate are expressed by the following reaction formulae:

(1) Preparation of Monoglyceride:

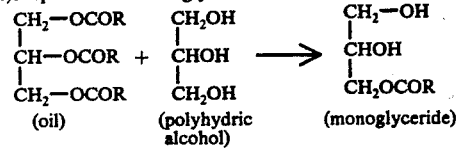

(2) Formation of Urethanated Oil Resin:

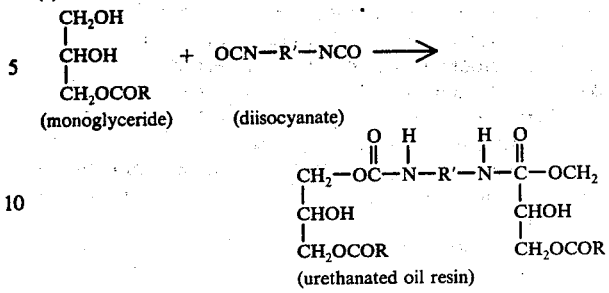

Formation of urethanated oil resins from the above oil, polyhydric alcohol and diisocyanate components may be effected according to known synthesis methods, and commercially available urethanated oil resins may also be used in this invention as they are.

The "vinyl polymer" includes copolymers formed by copolymerizing (1) a major amount, preferably at least 90 mole %, of an unsaturated monomer such, for example, as acrylic acid esters having 5 to 18 carbon atoms in the alkyl portion, e.g., n-butyl acrylate, isobutyl acrylate, t-butyl acrylate, 2-ethylhexyl acrylate, lauryl acrylate, tridecyl acrylate, stearyl acrylate, cyclohexyl acrylate, hexyl acrylate, isodecyl acrylate, dodecyl acrylate and octadecyl acrylate; methacrylic acid esters having 5 to 18 carbon atoms in the alkyl portion, e.g., n-butyl methacrylate, isobutyl methacrylate, t-butyl methacrylate, 2-ethylhexyl methacrylate, lauryl methacrylate, tridecyl methacrylate, cyclohexyl methacrylate, hexyl methacrylate, isodecyl methacrylate, dodecyl methacrylate and octadecyl methacrylate; dialkyl fumarates, e.g., dihexyl fumarate, dioctyl fumarate, di-2-ethylhexyl fumarate, didodecyl fumarate and dioctadecyl fumarate; dialkyl itaconates such as dihexyl itaconate, di-2-ethylhexyl itaconate, didodecyl itaconate and dioctadecyl itaconate; and vinyl stearate; with (2) a minor amount, preferably up to 10 mole %, of a hydroxyl group-containing unsaturated monomer such, for example, as 2-hydroxyethyl acrylate, 2-hydroxypropyl acrylate, 2-hydroxyethyl methacrylate, 2-hydroxypropyl methacrylate and N-methylol acrylamide.

In this invention, as described hereinabove, the partially blocked isocyanate compound having a free isocyanate group and a blocked isocyanate group and the active hydrogen-containing, polymer compound are so selected that the sum of the number of the free and blocked isocyanate groups in one molecule of the partially blocked isocyanate compound and the number of the active hydrogen group in one molecule of the active hydrogen-containing, polymer compound is at least 5, and they are reacted at such a ratio that the amount of the active hydrogen group of the active hydrogen-containing, polymer compound is at least equivalent to the amount of the free isocyanate group of the partially blocked isocyanate compound. For instance, in case the partially blocked isocyanate compound has one free isocyanate group and one blocked isocyanate group in the molecule, a polymer compound having at least 3 active hydrogen groups in the molecule is employed. In the case of the partially blocked isocyanate compound having one free isocyanate group and 2 blocked isocyanate groups or having 2 free isocyanate groups and one blocked isocyanate group, a polymer compound having at least 2 active hydrogen groups is employed.

Accordingly, in this invention, all of the free isocyanate groups contained in the partially blocked isocyanate compounds react with the active hydrogen-containing, polymer compound to form a urethane linkage, while the blocked isocyanate groups are left unreacted. As a result, there can be obtained a reaction product (stabilizer) between the partially blocked isocyanate compound and the active hydrogen-containing, polymer compound, which has both the blocked isocyanate and active hydrogen groups, the total number of which is at least 3.

Instances of the reaction of formation of such stabilizer are as follows:

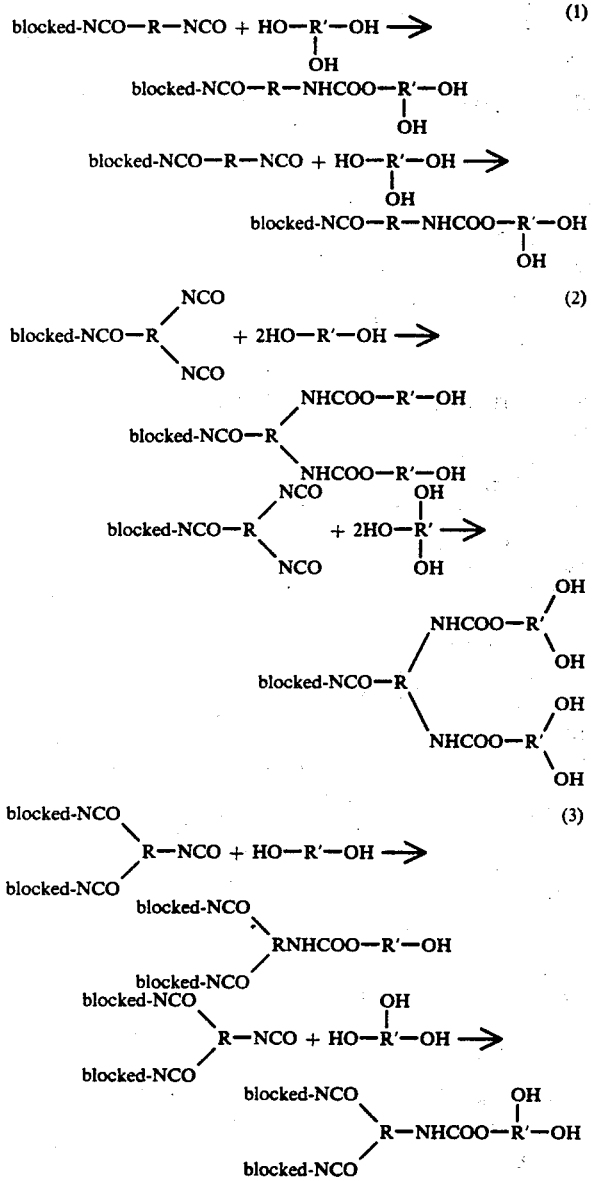

In each of the above reaction formulae, R and R' stand for a residue of a partially blocked isocyanate compound and a residue of an active hydrogen-containing; polymer compound, respectively.

In this invention, the reaction between the partially blocked isocyanate compound and the active hydrogen-containing, polymer compound is carried out according to procedures customarily used for the reaction between ordinary isocyanate compounds and active hydrogen-containing polymer compounds. In general, the reaction is conducted at about 50 to about 160° C. in the presence of an inert solvent and a catalyst.

As the inert solvent, there may be used solvents exemplified above as those usable for the partial blocking reaction of polyisocyanate compounds and organic liquids to be used as polymer dispersion media. Catalysts such as those mentioned with respect to the partial blocking reaction can also be used for the reaction between the partially blocked isocyanate compound and the active hydrogen-containing, polymer compound.

In this invention, the active hydrogen-containing, polymer compound is employed in an amount at least equivalent to the amount of the partially blocked isocyanate compound. It is preferred that the ratio of the active hydrogen groups in the active hydrogen group-containing, polymer compound to the free isocyanate groups in the partially blocked isocyanate compound is 1.0 to 3, especially 1.1 to 2.5, and that the ratio of the active hydrogen groups in the active hydrogen-containing, polymer compound to the sum of the free and blocked isocyanate groups in the partially blocked isocyanate compound is 0.5 to 1.5, especially 0.8 to 1.3.

It is also preferred that the reaction product between the partially blocked isocyanate compound and the active hydrogen-containing, polymer compound, namely the stabilizer soluble in an organic liquid used as the dispersion medium, is employed in such an amount that the stabilizer occupies 30 to 80% by weight, especially 40 to 75% by weight, of the total dispersed solids.

The "copolymerizable unsaturated monomer" to be used in this invention includes monomers having in the molecule a copolymerizable group $>C=C<$. As such monomer, there may be exemplified (a) nitrile type monomers such as acrylonitrile, methacrylonitrile and fumaronitrile; (b) allyl type monomers such as allyl acetate, diallyl acetate, diallyl adipate, allyl chloride, allyl alcohol, 2-chloroallyl acetate, 2-chloroallyl chloride, methallyl acetate and methallyl chloride; (c) ethylene type monomers such as cis-dichloroethylene, trans-dichloroethylene, tetrachloroethylene and trichloroethylene, (d) unsaturated dibasic acids such as maleic anhydride, diethyl maleate and fumaric acid; (e) unsaturated carboxylic acids such as acrylic acid, methacrylic acid and itaconic acid; (f) acrylic acid esters such as methyl acrylate, ethyl acrylate, n-propyl acrylate, isopropyl acrylate, n-butyl acrylate, isobutyl acrylate, t-butyl acrylate, 2-ethylhexyl acrylate, lauryl acrylate, dodecyl acrylate, stearyl acrylate, cyclohexyl acrylate, dimethylaminoethyl acrylate, diethylaminoethyl acrylate and glycidyl acrylate; (g) methacrylic acid esters such as methyl methacrylate, ethyl methacrylate, n-propyl methacrylate, isopropyl methacrylate, n-butyl methacrylate, isobutyl methacrylate, t-butyl methacrylate, 2-ethylhexyl methacrylate, lauryl methacrylate, dodecyl methacrylate, stearyl methacrylate cyclohexyl methacrylate, dimethylaminoethyl methacrylate, diethylaminoethyl methacrylate and glycidyl methacrylate; (h) styrene type monomers such as styrene, vinyl toluene and α-methyl styrene; (i) other monomers such as vinyl acetate, vinyl formate, vinyl propionate, vinyl stearate, divinylbenzene, di-isopropylbenzene, dimethyl itaconate, vinyl chloride and vinylidene chloride; and (j) hydroxyl group-containing unsaturated monomers such as 2-hydroxyethyl acrylate, 2-hydroxypropyl acrylate, 2-hydroxyethyl methacrylate, 2-hydroxypropyl methacrylate and N-methylol acrylamide.

These monomers may be used singly or in the form of admixtures of two or more of them.

In case the copolymerizable monomer is solid at room temperature, it is necessary to use the monomer in the state incorporated and dissolved in another monomer that is liquid at room temperature.

In case a combination of two or more of the above copolymerizable monomers is employed, it is preferred that an alkyl ester of acrylic or methacrylic acid having 1 to 3 carbon atoms in the alkyl portion, a vinyl ester monomer having 3 to 5 carbon atoms in the alkyl portion, or a styrene type monomer is used in an amount greater than 20% by weight of the total monomers.

When commercially available products of these copolymerizable monomers are employed, it is not always necessary to exclude therefrom polymerization initiators usually found in commercial products, such as hydroquinone.

A radical initiator may be used for the preparation of polymer dispersions. As the radical initiator there may be mentioned, for instance, organic peroxide initiators such as benzoyl peroxide, lauroyl peroxide, cumene hydroperoxide, di-tert-butyl peroxide and acetyl peroxide, and nitrile type initiators such as $\alpha,\alpha'$-azobisisobutyronitrile. The amount of the initiator is 0.01 to 3% by weight; preferably 0.5 to 1% by weight, based on the total monomers.

In carrying out the process of this invention, the reaction temperature is 50° to 140° C., preferably 70° to 100° C., and the polymerization time is preferably 1 to 10 hours. The addition of copolymerizable monomers may be accomplished dividely in two or more times. It is preferable to introduce nitrogen into a reaction vessel during the polymerization, but introduction of nitrogen is not always necessary. In some special cases, for instance, in case gaseous monomers are employed, the reaction may be carried out under pressure.

In the polymer dispersions obtained according to this invention, the average size of the dispersed particles is within a range of from 0.1 to 10$\mu$.

The polymer dispersions obtained according to this invention is a self-cross-linkable polymer dispersion where the blocked isocyanate group and active hydrogen group are contained in the component soluble in the organic liquid, namely the stabilizer, and in some cases, the active hydrogen group is contained also in the dispersed polymer. In this synthetic polymer dispersion, the blocked isocyanate group and active hydrogen group are generally present at a blocked isocyanate group/active hydrogen group ratio of about 0.1 to about 2.0, preferably 0.5 to 1.3.

When the thus obtained synthetic polymer dispersion is heated at 100° to 250° C. for 10 to 60 minutes, the blocking agent is released from the blocked isocyanate group to form a free isocyanate group, whereby the dispersed particles are fused and adhere to one another and they simultaneously react with the active hydrogen group to thereby form a three-dimensional polymer. Accordingly, in the synthetic polymer dispersion of this invention, a three-dimensional polymer can be formed only by heating without particular incorporation of an active hydrogen-containing substance, but it is possible to employ in combination an active hydrogen-containing resin according to need.

In case the synthetic polymer dispersion of this invention is used as a coating composition, it is possible to add an organic or inorganic pigment, a releasing catalyst (same as those exemplified above as catalyst for the partial blocking reaction, for instance, tertiary amines and organotin compounds), a levelling agent, a drier, an extender and the like.

Films excellent in gloss, water resistance, chemical resistance, weatherability, solvent resistance and other properties can be prepared from the synthetic polymer dispersion of this invention.

In case the synthetic polymer dispersion is used as a coating composition, it may be applied on a substrate such as a plate of a metal, e.g., iron, aluminum, zinc and zinc-plated steel, plywood, wooden board, paper, cloth, fabrics and plastics.

In the synthetic polymer dispersion of this invention, the soluble polymer component (stabilizer) comprises the blocked isocyanate group and active hydrogen group as cross-linking components in one molecule, but since the isocyanate group is blocked, a good dispersion state can be kept during the synthesis reaction and the resulting polymer dispersion has an excellent storage stability.

Further, the synthetic polymer solution contains the active hydrogen group and blocked isocyanate group in the soluble component of one molecule and, in addition, a dispersed polymer of a high molecular weight. Therefore, the dispersion exhibits a high reactivity at the time of curing and gives a heat-set film which is tough and has excellent properties.

This invention will now be illustrated more concretely by reference to Examples, in which all of "parts" and "percentages" are on the weight basis, unless otherwise indicated.

EXAMPLE 1

Seventy parts of diacetyl monoxime were gradually added to 250 parts of $\omega,\omega'$-diisocyanate-dimethylbenzene, and they were reacted at 60° C. The unreacted diisocyanate was removed by extraction with a 1:1 mixed solvent of hexane and benzene. The extraction residue was added to ethyl acetate to form an ethyl acetate solution containing about 75% of a partially blocked isocyanate compound.

2000 parts of a cotton seed oil-modified, medium oil alkyd resin composed of cotton seed oil fatty acid, phthalic anhydride, pentaerythritol and ethylene glycol and having a non-volatile content of 50%, a viscosity of U as measured at 20° C. according to the Gardner-Holdt method, an oil length of 55%, an acid value of 8 as measured with respect to the solids and an OH value of 100 as measured with respect to the solids, and 1,000 parts of mineral spirits were charged in a reaction vessel equipped with a stirrer, a thermometer, a cooling tube and a dropping funnel. The inside atmosphere of the reaction vessel was replaced by nitrogen, and the charges were heated to 80° C. Then, 430 parts of the above 75% solution of the partially blocked isocyanate compound was added dropwise to the charges of the reaction vessel to effect the reaction. As a result, there was obtained a faintly yellow, transparent solution of a stabilizer containing no free isocyanate groups but containing blocked isocyanate groups and being soluble in mineral spirits. In this case, the ratio of the active hydrogen group in the active hydrogen-containing, polymer compound to the free isocyanate groups in the partially blocked isocyanate compound (hereinafter referred to as "active H/free NCO ratio") was 1.8, and the ratio of the active hydrogen group in the active hydrogen-containing, polymer compound to the sum of the free and blocked isocyanate groups in the partially blocked isocyanate compound (hereinafter referred to as "active H/free and blocked NCO ratio") was 0.9. A mixture of 500 parts of methyl methacrylate, 100 parts of acrylonitrile, 200 parts of styrene and 8 parts of benzoyl peroxide, which had been charged in the dropping funnel in advance, was added dropwise over a period of about 2 hours to the stabilizer solution which was maintained at 80° 1 to 83° C., and then, the reaction was carried out for 6 hours at 80° to 83° C. to obtain a milky white, synthetic polymer dispersion having a solids content of 50% and a viscosity of U-V as measured at 20° C. according to the Gardner-Holdt method. In this synthetic polymer dispersion, the ratio of the blocked isocyanate group to the free active hydrogen groups (hereinafter referred to as "blocked NCO/free active H ratio") was 1.3.

When the thus formed synthetic polymer dispersion was coated on an iron plate and baked at 180° C. for 30 minutes, the curing was effected and a transparent, tough film was obtained. In case tetra-n-butyl-1,3-diacetoxy-distannoxane was added in an amount of 0.5% as a catalyst, the curing was accomplished for 30 minutes at 140° C.

EXAMPLE 2

Ninety-four parts of phenol were added to 200 parts of tolylene diisocyanate, and 0.14 part of tetra-n-butyl-1,3-diacetoxy-distannoxane was added to the mixture as a catalyst. The mixture was reacted at 90° C. for 5 hours. The unreacted diisocyanate was removed by extraction with n-hexane, and the extraction residue was dissolved in ethyl acetate. The insoluble portion (the diadduct of the diisocyanate) was removed by filtration, and there was obtained a solution of a monoadduct (1 mole of the diisocyanate and 1 mole of the blocking agent) substantially free of the diadduct of the diisocyanate and the unreacted diisocyanate. 280 parts of the thus formed 75% solution of the monoadduct in ethyl acetate were reacted with 1,480 parts of the same 50 % cotton seen oil-modified, medium oil alkyd resin as employed in Example 1 (active H/free NCO ratio = 1.0; active H/free and blocked NCO ratio = 0.5) to obtain a faintly yellow, transparent solution of a stabilizer containing no free isocyanate group but containing a blocked isocyanate group and being soluble in mineral spirits.

1,000 parts of the above solution of the blocked isocyanate group-containing stabilizer and 500 parts of mineral spirits were charged into a reaction vessel equipped with a stirrer, a thermometer, a cooling tube and a dropping funnel, and the inside atmosphere of the reaction vessel was replaced by nitrogen and the charges were heated to 80° C. Then, a mixture of 300 parts of methyl methacrylate, 50 parts of acrylonitrile, 60 parts of 2-hydroxyethyl methacrylate, 100 parts of styrene and 5 parts of benzoyl peroxide, which had been charged in the dropping funnel in advance, were added dropwise over a period of about 2 hours to the charges of the reaction vessel which were maintained at 80° to 83° C. The reaction was carried out at 80° to 83° C. to obtain a milky white, synthetic polymer dispersion having a solids content of 50% and a viscosity of U-X as measured at 20° C. according to the Gardner-Holdt method (blocked HCO/free active H ratio = 1.1). This polymer dispersion is a self-cross-linkable polymer dispersion containing the blocked isocyanate group and active hydrogen group (OH group) in the soluble portion and also containing the active hydrogen group (OH group) in the dispersed polymer portion. When the thus formed polymer dispersion was coated on an iron plate and baked at 160° C. for 30 minutes, the blocking agent was released from the blocked isocyanate group, and the resulting free isocyanate group was reacted with the OH group, whereby a transparent cured film was obtained.

EXAMPLE 3

One hundred and fifty five parts of mineral spirits were added to 1,000 parts of a solution of a stabilizer containing no free isocyanate group but containing a blocked isocyanate group and being soluble in mineral spirits, which has a solids content of about 38.5% and was prepared in the same manner as described in Example 1. While the temperature of the resulting mixture was being controlled at 80° to 83° C., a mixture of 193 parts of methyl methacrylate, 77 parts of acrylonitrile, 77 parts of styrene, 38 parts of butyl methacrylate and 4 parts of benzoyl peroxide, which had been formed in advance, was added dropwise over a period of about 3 hours to the above mixture, and after completion of the dropwise addition the reaction was carried out for about 4 hours at 80° to 83° C. Then, 1 part of azobisisobutyronitrile was added to the reaction mixture and the reaction was further conducted for 2 hours. Then, 1 part of azobisisobutyronitrile was added again to the reaction mixture and the reaction was further conducted at 80° to 83° C. for 2 hours, to obtain a milky white, synthetic polymer dispersion having a solids content of 50% and a viscosity of S-T as measured at 20° C. according to the Gardner-Holdt method (blocked NCO/free active H ratio = 1.3). When the thus formed polymer dispersion was coated on an iron plate and baked at 180° C. for 30 minutes, a transparent tough film was obtained. As a result of the solvent extraction test, it was found that the resulting film was highly cross-linked.

EXAMPLE 4

Six hundred and fifty parts of mineral spirits were added to 1,000 parts of a solution of a mineral spirit-soluble, blocked isocyanate group-containing stabilizer containing no free isocyanate groups, which had a non-volatile content of about 55 % and was prepared in the same manner as described in Example 2. While the temperature of the mixture was being controlled to 80° to 83° C., a mixture of 220 parts of methyl methacrylate, 110 parts of acrylonitrile, 110 parts of styrene, 55 parts of butyl methacrylate, 55 parts of N-n-butoxymethyl acrylamide and 5.5 parts of benzoyl peroxide, which had been prepared in advance, was added dropwise over a period of about 3 hours to the above mixture, and after completion of the dropwise addition, the reaction was carried out at 80° to 83° C. for about 4 hours. Then, 1 part of benzoyl peroxide was added to the reaction mixture and the reaction was further conducted for 3 hours, to obtain a milky white, synthetic polymer dispersion having a solids content of 50% and a viscosity of T-U as measured at 20° C. according to the Gardner-Holdt method (blocked NCO/free active H ratio = 1.5). When the thus formed polymer dispersion was heated at 160° C. for 30 minutes, a transparent, tough, highly cross-linked film was obtained.

EXAMPLE 5

One hundred and sixty four parts of hexamethylene diisocyanate were dissolved in 63 parts of cellosolve acetate, and 87 parts of methylethylketoxime were gradually added to the solution to effect the reaction between the diisocyanate and oxime and obtain a 75% solution of a partially blocked isocyanate compound.

2,000 parts of a soybean oil modified epoxy resin varnish having an oil length of 57 %, an acid value of 6, an OH value of 60 (as measured with respect to the solids) and a non-volatile content of 50% and 1,000 parts of mineral spirits were charged into a reaction vessel equipped with a stirrer, a thermometer, a cooling tube and a dropping funnel, and the inside atmosphere of the reaction vessel was replaced by nitrogen and the charges were heated to 80° C. 160 parts of the above 75% solution of the partially blocked isocyanate compound (active H/free NCO ratio = 2.3; active H/free and blocked NCO ratio = 1.1) was added dropwise to the charges of the reaction vessel to effect the reaction. As a result, there was obtained a faintly yellow, transparent solution of a stabilizer containing no free isocyanate groups but containing a blocked isocyanate group and being soluble in mineral spirit. While the temperature of the resulting solution was being controlled to 80° to 83° C., a mixture of 500 parts of methyl methacrylate, 100 parts of acrylonitrile, 200 parts of styrene and 4 parts of benzoyl peroxide, which had been charged in the dropping funnel in advance, were added dropwise over a period of about 3 hours to the above solution. After completion of the dropwise addition, the reaction was conducted at 80° to 83° C. for about 4 hours. Then, 1 part of azobisisobutyronitrile was added to the reaction mixture, and the reaction was further conducted for 2 hours, to obtain a milky white, synthetic polymer dispersion having a solids content of 50% and a viscosity of T-U as measured at 20° C. according to the Gardner-Holdt method (blocked NCO/free active H ratio = 0.8).

When the thus formed synthetic polymer dispersion was coated on a metal plate and cured under heat at 160° C. for 30 minutes, a transparent, tough film was obtained. As a result of the solvent extraction test, it was found that the film was highly cross-linked.

EXAMPLE 6

Two thousand parts of a soybean oil-modified urethanated resin varnish having an oil length of 60%, an OH value of 50 (as measured with respect to the solids) and a non-volatile content of 50% and 1,000 parts of mineral spirits were charged in a reaction vessel equipped with a stirrer, a thermometer, a cooling tube and a dropping funnel, and the inside atmosphere was replaced by nitrogen and the temperature of the charges was elevated to 80° C. Then, 250 parts of a 75% solution of a partially blocked isocyanate compound (active H/free NCO = 1.3; active H/free and blocked NCO ratio = 0.6), which was prepared in the same manner as described in Example 2, were added dropwise to the charges of the reaction vessel to effect the reaction between the urethanated oil and partially blocked isocyanate compound. As a result, there was obtained a faintly yellow, transparent solution of a stabilizer containing no free isocyanate groups but containing a blocked isocyanate group and being soluble in mineral spirits. While the temperature of the solution was being maintained at 80° to 83° C., a mixture of 400 parts of methyl methacrylate, 40 parts of acrylonitrile, 60 parts of N-methylol acrylamide, 200 parts of styrene and 5 parts of benzoyl peroxide, which had been charged in the dropping funnel in advance, was added dropwise over a period of about 3 hours to the above stabilizer solution. After completion of the dropwise addition, the reaction was carried out at 80° to 83° C. for about 4 hours. Then, 1 part of azobisisobutyronitrile was added to the reaction mixture and the reaction was further conducted for 2 hours, to obtain a milky white, synthetic polymer dispersion having a solids content of 50% and a viscosity of S-T as measured at 20° C. according to the Gardner-Holdt method (blocked NCO/free active H ratio = 0.9).

When a mixture of 100 parts of the thus formed polymer dispersion and 1 part of dibutyl tin dilaurate was coated on a metal plate and baked at 140° C. for 30 minutes, a cured film excellent in the solvent resistance and toughness was obtained.

EXAMPLE 7

Two hundred and sixty parts of 4,4'-methylene-bis(-cyclohexyl isocyanate) and 120 parts of ε-caprolactam were reacted in 130 parts of cellosolve acetate to obtain a 75% solution of a partially blocked isocyanate compound.

3,000 parts of a soybean oil-modified medium oil alkyd resin derived from soybean fatty acid, phthalic anhydride, pentaerythritol and ethylene glycol and having a non-volatile content of 50%, a viscosity of S-T as measured at 20° C. according to the Gardner-Holdt method, an oil length of 53%, an acid value of 6 as measured with respect to the solids and an OH value of 60 as measured with respect to the solids, and 1,000 parts of mineral spirits were charged in a reaction vessel equipped with a stirrer, a thermometer, a cooling tube and a dropping funnel. The inside atmosphere of the reaction vessel was replaced by nitrogen and the temperature of the charges was elevated to 85° C. Then, 510 parts of the above 75% solution of the partially blocked isocyanate compound (active H/free NCO ratio = 1.6; active H/free and blocked NCO ratio = 0.8) were added dropwise to the charges of the reaction vessel to effect the reaction between the soybean oil-modified alkyd resin and partially blocked isocyanate compound. As a result, there was obtained a faintly yellow, transparent solution of a stabilizer containing no free isocyanate group but containing a blocked isocyanate group and being soluble in mineral spirit. While the temperature of the stabilizer solution was being controlled to 85° to 90° C., a mixture of 600 parts of methyl methacrylate, 100 parts of acrylonitrile, 50 parts of butyl acrylate and 7.5 parts of benzoyl peroxide, which had been charged in the dropping funnel in advance, were added dropwise over a period of about 2 hours to the above stabilizer solution. After completion of the dropwise addition, the reaction was carried out at 85° to 90° C. for 8 hours to obtain a milky white, synthetic polymer dispersion having a solids content of 50% and a viscosity of T-U as measured at 20° C. according to the Gardner-Holdt method (blocked NCO/free active H ratio = 0.6).

When the thus formed polymer dispersion was coated on an iron plate and baked at 180° C. for 30 minutes, a transparent and tough film was obtained. When 0.5% of dibutyl tin laurate was added to the polymer dispersion as a catalyst, the curing was accomplished at 140° C. for 30 minutes.

EXAMPLE 8

Three thousand parts of the same 50% soybean oil-modified alkyd resin as employed in Example 7 and 1,000 parts of mineral spirits were charged into the same reaction vessel as used in Example 7. The inside atmosphere of the reaction vessel was replaced by nitrogen and the temperature of the charges was elevated to 85° C. Then, 510 parts of a 75% solution of a partially blocked isocyanate compound (active H/free NCO ratio = 1.6; active H/free and blocked NCO ratio = 0.8) prepared in the same manner as described in Example 7 were added dropwise to the charges of the reaction vessel to effect the reaction between the soybean oil-modified alkyd resin and partially blocked isocyanate compound. As a result there was obtained a faintly yellow, transparent solution of a stabilizer containing no free isocyanate group but containing a blocked isocyanate group and being soluble in mineral spirits. While the temperature of the stabilizer solution was being controlled to 85° to 90° C., a mixture of 500 parts of methyl methacrylate, 100 parts of 2-hydroxyethyl methacrylate, 150 parts of styrene and 7.5 parts of benzoyl peroxide, which had been charged in the dropping funnel in advance, were added dropwise over a period of about 2 hours to the above stabilizer solution. After completion of the dropwise addition, the reaction was conducted at 85° to 90° C. for 8 hours, to obtain a milky white, synthetic polymer dispersion having a solids content of about 50% and a viscosity of S-T as measured at 20° C. according to the Gardner-Holdt method (blocked NCO/free active H ratio = 0.7).

When the thus formed polymer dispersion was coated on an iron plate and baked at 180° C. for 30 minutes, a transparent and tough film was obtained.

EXAMPLE 9

Two hundred and twenty parts of isophorone diisocyanate and 80 parts of n-butyl alcohol were reacted in 100 parts of ethyl acetate to obtain a 75% solution of a partially blocked isocyanate compound.

3,000 parts of a soybean oil-modified epoxy-modified alkyd resin derived from soybean oil fatty acid, an epoxy resin, pentacrythritol and phthalic anhydride and having a non-volatile content of 50%, a viscosity of S as measured at 20° C. according to the Garder-Holdt method, an oil length of 60%, an acid value of 8 as measured with respect to the solids and an OH value of 100 as measured with respect to the solids, and 1,000 parts of mineral spirits were charged into a reaction vessel equipped with a stirrer, a thermometer, a cooling tube and a dropping funnel. The inside atmosphere of the reaction vessel was replaced by nitrogen and the temperature of the charges was elevated to 85° C. Then, 400 parts of the above 75% solution of the partially blocked isocyanate compound (active H/free NCO ratio = 2.6; active H/free and blocked NCO ratio = 1.3) were added dropwise to the charges of the reaction vessel to effect the reaction between the soybean oil-modified epoxy-modified alkyd resin and the partially blocked isocyanate compound. As a result there was obtained a faintly yellow, transparent solution of a stabilizer containing no free isocyanate group but containing a blocked isocyanate group and being soluble in mineral spirits. While the temperature of the thus obtained stabilizer solution was being controlled to 85° to 90° C., a mixture of 500 parts of methyl methacrylate, 100 parts of acrylonitrile, 200 parts of butyl methacrylate and 8 parts of benzoyl peroxide, which had been charged in the dropping funnel in advance, were added dropwise over a period of about 2 hours to the stabilizer solution. After completion of the dropwise addition, the reaction was conducted at 85° to 90° C. for 8 hours, to obtain a milky white, synthetic polymer solution having a solids content of about 50% and a viscosity of V as measured at 20° C. according to the Gardner-Holdt method (blocked NCO/free active H ratio = 0.6).

EXAMPLE 10

Two hundred and ten parts of lysine diisocyanate methyl ester and 120 parts of ethylene glycol monobutyl ether were reacted in 110 parts of ethyl acetate to obtain a 75% solution of a partially blocked isocyanate compound.

2,000 parts of a soybean oil-modified urethanated oil derived from soybean oil, pentaerythritol, ethylene glycol and hexamethylene diisocyanate and having a non-volatile content of 50%, a viscosity of U as measured at 20° C. according to the Gardner-Holdt method, an oil length of 60% and an OH value of 100 as measure with respect to the solids, and 1,000 parts of mineral spirits were charged into a reaction vessel equipped with a stirrer, a thermometer, a cooling tube and a dropping funnel. The inside atmosphere of the reaction vessel was replaced by nitrogen and the temperature of the charges was elevated to 85° C. Then, 440 parts of the above 75% solution of the partially blocked isocyanate compound (active H/free NCO ratio = 1.8; active H/free and blocked NCO ratio = 0.9 ) were added dropwise to the charges of the reaction vessel to effect the reaction between the soybean oil-modified urethanated oil and partially blocked isocyanate compound. As a result there was obtained a faintly yellow, transparent solution of a stabilizer containing no free isocyanate group but containing a blocked isocyanate group and being soluble in mineral spirits. While temperature of the thus formed stabilizer solution was being controlled to 85° to 90° C., a mixture of 500 parts of methyl methacrylate, 200 parts of styrene, 80 parts of ethyl acrylate and 8 parts of benzoyl peroxide, which had been charged in the dropping funnel in advance, was added dropwise over a period of about 2 hours to the above stabilizer solution. After completion of the dropwise addition, the reaction was conducted at 85° to 90° C. for 8 hours, to obtain a milky white, synthetic polymer dispersion having a solids content of about 50% and a viscosity of W as measured at 20° C. according to the Gardner-Holdt method (blocked NCO/free active H ratio = 1.3).

When the synthetic polymer dispersions obtained in Examples 9 and 10 were coated on an iron plate and baked at 180° C. for 30 minutes, there were obtained transparent, tough films. In each case, when 0.5% of triethylene diamine was added as a catalyst, the curing was accomplished at 140° C. for 30 minutes.

Results of tests made to evaluate the properties of the films obtained in Examples 1 to 10 are shown collectively in the following Table.

Table

| Properties of Film | Example 1 | Example 2 | Example 3 | Example 4 | Example 5 | Example 6 | Example 7 | Example 8 | Example 9 | Example 10 |
|---|---|---|---|---|---|---|---|---|---|---|
| Pencil Hardness | 2H | H | F | F | 2H | 2H | F | F | H | F |
| Adhesion (1 mm cut squares) | 100/100 | 100/100 | 100/100 | 100/100 | 100/100 | 100/100 | 100/100 | 100/100 | 100/100 | 100/100 |

Table-continued

| Properties of Film | Example 1 | Example 2 | Example 3 | Example 4 | Example 5 | Example 6 | Example 7 | Example 8 | Example 9 | Example 10 |
|---|---|---|---|---|---|---|---|---|---|---|
| Impact Resistance (1/2", 500 g) | 50 cm < | 50 cm < | 50 cm < | 50 cm < | 50 cm < | 50 cm < | 50 cm < | 50 cm < | 50 cm < | 50 cm < |
| Erichsen test | 7 mm < | 7 mm < | 7 mm < | 7 mm < | 7 mm < | 7 mm < | 7 mm < | 7 mm < | 7 mm < | 7 mm < |
| Water Resistance (Immersion in water for 200 hrs.) | ○ | ○ | ○ | ○ | ○ | ○ | ○ | ○ | ○ | ○ |
| Alkali Resistance (Immersion 5 % NaOH for 24 hrs.) | ○ | ○ | ○ | ○ | ◎ | ◎ | ○ | ○ | ◎ | ◎ |
| Acid Resistance (Immersion 5 % $H_2SO_4$ for 96 hrs.) | ○ | ○ | ○ | ○ | ◎ | ◎ | ○ | ○ | ◎ | ◎ |
| Moisture Resistance (50° C., 95 % RH, 48 hrs.) | ○ | ○ | ○ | ○ | ○ | ○ | ○ | ○ | ○ | ○ |
| Salt Spray Test (5 % NaCl, 100 hrs.) | ○ | ◎ | ○ | ◎ | ○ | ◎ | ○ | ◎ | ○ | ○ |

◎ : excellent
○ : good

What we claim is:

1. A thermosetting synthetic polymer dispersion comprising a non-polar organic liquid or an organic liquid having a low polarity as a dispersion medium and particles of a copolymer formed by copolymerization of copolymerizable unsaturated monomers, said copolymer particles having around the periphery thereof a protective layer of a stabilizer which is a vinyl polymer (a) having a component compatible with said copolymer or being chemically bonded to said copolymer and (b) being solvated in said organic liquid and containing blocked isocyanate and active hydrogen groups, and formed by reacting a partially blocked ioscyanate compound having a free isocyanate group and a blocked isocyanate group with an active hydrogen-containing polymer compound, wherein the sum of the number of the free and blocked isocyanate groups in one molecule of the partially blocked isocyanate compound and the number of the active hydrogen groups in one molecule of the active hydrogen-containing polymer compound is at least 5, and they are reacted at such a ratio that the amount of the active hydrogen groups of the active hydrogen-containing polymer compound is at least equivalent to the amount of the free isocyanate groups of the partially blocked isocyanate compound; the ratio of the active hydrogen groups in the active hydrogen group-containing polymer compound to the free isocyanate groups in the partially blocked isocyanate compound being 1.0 to 3, and the ratio of the active hydrogen groups in the active hydrogen-containing polymer compound to the sum of the free and blocked isocyanate groups in the partially blocked isocyanate compound being 0.5 to 1.5; and the amount of stabilizer being from 30 to 80% by weight of the total dispersed solids, said copolymer being made in the form of particles of a size 0.1 to 10 μ stably dispersed in said organic liquid by said protective layer.

2. The thermosetting synthetic polymer dispersion of claim 1 wherein said copolymer contains an active hydrogen group.

3. The thermosetting synthetic polymer dispersion of claim 1 wherein said stabilizer comprises 40 to 75% by weight of the total solids in the polymer dispersion.

4. The thermosetting synthetic polymer dispersion of claim 1 wherein said vinyl polymer comprises a copolymer containing not more than 10 mole % of an hydroxyl group containing unsaturated monomer component.

5. A thermosetting synthetic polymer dispersion comprising a non-polar organic liquid or an organic liquid having a low polarity as a dispersion medium and particles of a copolymer formed by copolymerization of copolymerizable unsaturated monomers, said copolymer particles having around the periphery thereof a protective layer of a stabilizer which is a vinyl polymer (a) having a component compatible with said copolymer or being chemically bonded to said copolymer and (b) being solvated in said organic liquid and containaing blocked isocyanate and no active hydrogen groups, and formed by reacting a partially blocked isocyanate compound having a free isocyanate group and a blocked isocyanate group with an active hydrogen-containing polymer compound wherein the sum of the number of the free and blocked isocyanate groups in one molecule of the partially blocked isocyanate compound and the number of the active hydrogen groups in one molecule of the active hydrogen-containing polymer compound is at least 5, and they are reacted at such a ratio that the amount of the active hydrogen groups of the active hydrogen-containing polymer compound is at least equivalent to the amount of the free isocyanate groups of the partially blocked isocyanate compound; the ratio of the active hydrogen groups in the active hydrogen group-containing polymer compound to the free isocyanate groups in the partially blocked isocyanate compound being 1.0 to 3, and the ratio of the active hydrogen groups in the active hydrogen containing polymer compound to the sum of the free and blocked isocyanate groups in the partially blocked isocyanate compound being 0.5 to 1.5; and the amount of stabilizer being from 30 to 80% by weight of the total dispersed solids, said copolymer having active hydrogen groups and being made in the form of particles of a size of 0.1 to 10 μ stably dispersed in said organic liquid by said protective layer.

6. The thermosetting synthetic polymer dispersion of claim 5 wherein said stabilizer comprises 40 to 75% by weight of the total solids in the polymer dispersion.

* * * * *